(12) United States Patent
Garrity et al.

(10) Patent No.: US 6,230,205 B1
(45) Date of Patent: May 8, 2001

(54) METHOD AND APPARATUS FOR MANAGING DELIVERY OF MULTIMEDIA CONTENT IN A COMMUNICATIONS SYSTEM

(75) Inventors: Martin Michael Garrity, Englewood; John Coyle Heneghan, Colorado Springs, both of CO (US); James L. Howser, Rowlett, TX (US); Heinrick Sinnreich, Richardson, TX (US); Edward D. Willis, Plano, TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/441,305

(22) Filed: Nov. 16, 1999

Related U.S. Application Data

(62) Division of application No. 09/007,622, filed on Jan. 15, 1998.

(51) Int. Cl.[7] .................................................. G06F 15/16
(52) U.S. Cl. ........................... 709/231; 709/232; 709/204
(58) Field of Search .................................... 709/203, 204, 709/217, 218, 219, 231, 233, 238, 227, 232, 250; 370/429, 477; 345/302; 348/7

(56) References Cited

U.S. PATENT DOCUMENTS

| | | | |
|---|---|---|---|
| 5,550,982 | * 8/1996 | Long et al. ............................ 709/219 |
| 5,568,181 | * 10/1996 | Greenwood et al. .................... 348/7 |
| 5,719,786 | * 2/1998 | Nelson et al. ........................ 709/219 |
| 5,886,995 | * 3/1999 | Arsenault et al. .................... 370/477 |
| 5,892,910 | * 4/1999 | Safadi ................................. 709/217 |
| 5,920,701 | * 7/1999 | Miller et al. ......................... 709/238 |
| 5,930,473 | * 7/1999 | Teng et al. ............................ 709/204 |
| 5,941,951 | * 8/1999 | Day et al. ............................. 709/233 |
| 5,973,679 | * 10/1999 | Abbott et al. ........................ 345/302 |
| 5,991,306 | * 11/1999 | Burns et al. ......................... 370/429 |
| 6,012,086 | * 1/2000 | Lowell ............................... 709/218 |

\* cited by examiner

*Primary Examiner*—Ayaz Sheikh
*Assistant Examiner*—Patrice Winder

(57) ABSTRACT

A method and apparatus for managing delivery of data, also referred to as "content", by a data processing system in a communications system in which a number of content providers and content consumers are located within the communications system. The data processing system receives a request to accept delivery of content at the data processing system, wherein the request originates from a requesting content provider. A determination is made as to when the content may be received from the requesting content provider and when the content may be transmitted to content consumers based on contents already scheduled to be delivered from the number of content providers. Delivery of the content from the requesting content provider is accepted based on a determination of when the content may be received and when the content may be transmitted.

19 Claims, 13 Drawing Sheets

METHOD AND APPARATUS FOR MANAGING DELIVERY OF MULTIMEDIA CONTENT IN A COMMUNICATIONS SYSTEM

This application is a divisional of U.S. patent application Ser. No. 09/007,622, filed on Jan. 15, 1998.

BACKGROUND OF THE INVENTION

1. Technical Field

The present invention relates generally to an improved communications system and in particular to a method and apparatus for transferring within the communications system. Still more particularly, the present invention relates to an improved method and apparatus for managing a transfer of data from a source to a target in the communications system.

2. Description of the Related Art

In the transmission of data within a communications system from a source to one or more targets or destinations, broadcasting is a form of addressing wherein the destination address specifies all destinations; all destinations indiscriminately receive the data whether or not the data is needed by the destination computer. Where data is not needed at a particular network-connected personal computer, the transmission of the data is an inefficient use of resources. This can be particularly disabling to a network that does not have sufficient bandwidth capacity for all of the data traffic. Broadcasting is less efficient in direct relation to the proportion of users in the community, receiving a broadcast, that do not need the broadcast data.

In contrast, unicasting is a form of addressing where the destination address specifies a single destination. Unicasting eliminates the unnecessary transmission of data to destinations that have no need for the data, but is still inefficient because the data will be replicated on the network for each individual destination. For example, when data is transmitted to 20 personal computers connected to a server, 20 transmissions of the data will be made, each with a different individual destination address.

Multicasting occurs when a source sends data to a closed group of destination computers. This form of addressing is particularly beneficial where the link between the source and the server has limited capacity or high cost because only one copy of the data that is intended for multiple recipients is transmitted from the source. Multicasting makes the most efficient use of an expensive link that has insufficient capacity of transmission to multiple destinations by reducing the number of transmissions across the critical link to one, rather than requiring that multiple transmissions be made for each destination address.

The Internet, an inter-network, is an example of a communications network in which multicasting may occur. Large amounts of information have been made available for all types of use on the Internet. Multimedia applications have become common place on the World Wide Web portion of the Internet. A multimedia application is an application that uses different forms of communication in a single application. For example, information may be displayed to a user of a multimedia application on a computer using voice, text, and video simultaneously. Videos and music also may be delivered via the Internet. Multimedia applications have brought many new users to the Internet. Additionally, the Internet is widely used for obtaining information on various topics of interest. Also, numerous commercial transactions occur using the Internet.

In addition to the Internet, other communications networks for transmitting data from a source to a target or destination includes, for example, satellite based communications networks, public switched telephone networks, and local area networks. In these different types of communications networks, multiple content providers have arisen to provide content consumers data in various types and forms. With multiple content providers, it is advantageous to have an improved method and apparatus for managing transfer of data within a communications system.

SUMMARY OF THE INVENTION

The present invention provides a method and apparatus for managing delivery of data, also referred to as "content", by a data processing system in a communications system in which a number of content providers and content consumers are located within the communications system. The data processing system receives a request to accept delivery of a content at the data processing system, wherein the request originates from a requesting content provider. A determination is made as to when the content may be received from the requesting content provider and when the content may be transmitted to content consumers based on contents already scheduled to be delivered from the number of content providers. Delivery of the content from the requesting content provider is accepted based on a determination of when the content may be received and when the content may be transmitted.

The present invention provides a method and apparatus for managing delivery of data in a communications system in which the communications system includes a network, content consumers connected to the network, and a data processing system connected to the network. The data processing system contains a storage device that stores content. A server in the data processing system sends a content to subscribers of the content, and a push broker, wherein the push broker manages delivery of contents by the server to the content consumers. A process is spawned by the push broker, wherein the process has a plurality of modes of operation including a first mode of operation in which the process monitors an interface to a content provider for initiation of transmission of a content from the content provider; a second mode of operation, responsive to detecting establishment of the communications link, in which the process determines whether the transmission is a valid transmission; and a third mode of operation, responsive to a valid transmission, in which the process directs the server to transmit the content to the content consumers.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
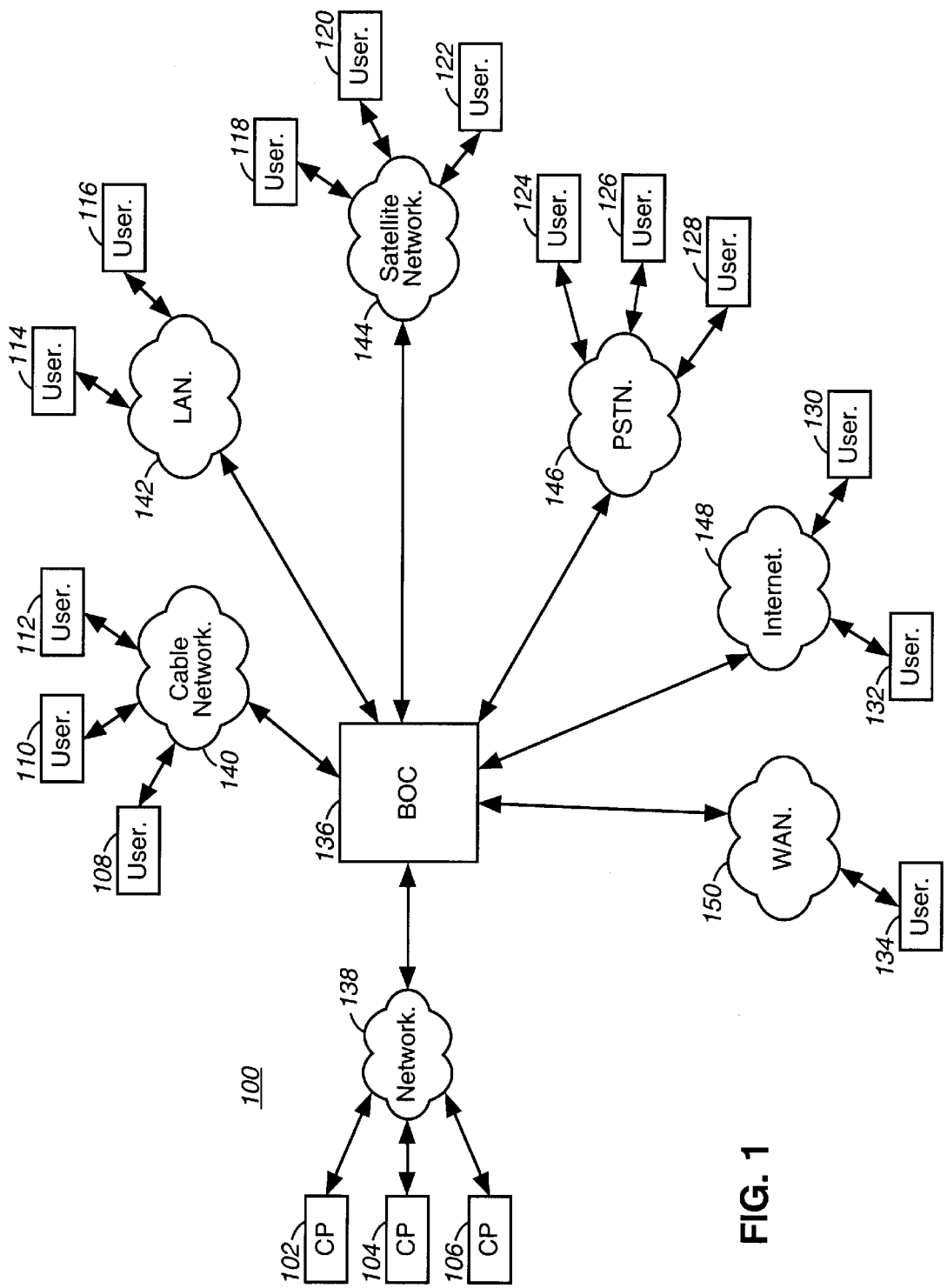
FIG. 1 is a diagram of a communications system in which a preferred embodiment of the present invention may be implemented.

With reference now to the figures, and in particular with reference to FIG. 1, a diagram of a communications system is depicted in which a preferred embodiment of the present invention may be implemented. In the depicted example, communications system 100 includes sources, content provider (CP) 102, CP 104, and CP 106, which transmit data to targets, users 108–134, also referred to content consumers. In the depicted example, the data is multicast to the users within communications system 100, although other types of data transmission, such as unicasting also may occur. Content providers (CPs) 102, 104, and 106 transmit data to an operations center (OC) 136 through network 138. OC 136 provides the mechanism for multicasting in the depicted example. Data is transmitted to users 108–134 through various types of communications networks within communications system 100. For example, users 108–112 receive data through cable network 140 while users 114 and 116 receive data through local area network (LAN) 142.

In accordance with a preferred embodiment of the present invention, OC 136 is especially suitable for managing the transfer of data from CPs 102–106 to users 118–122 through satellite network 144. The transfer of content to users 129–134 occur through other networks such as public switched telephone network (PSTN) 146, Internet 148 and wide area network (WAN) 150.

Figure 2:
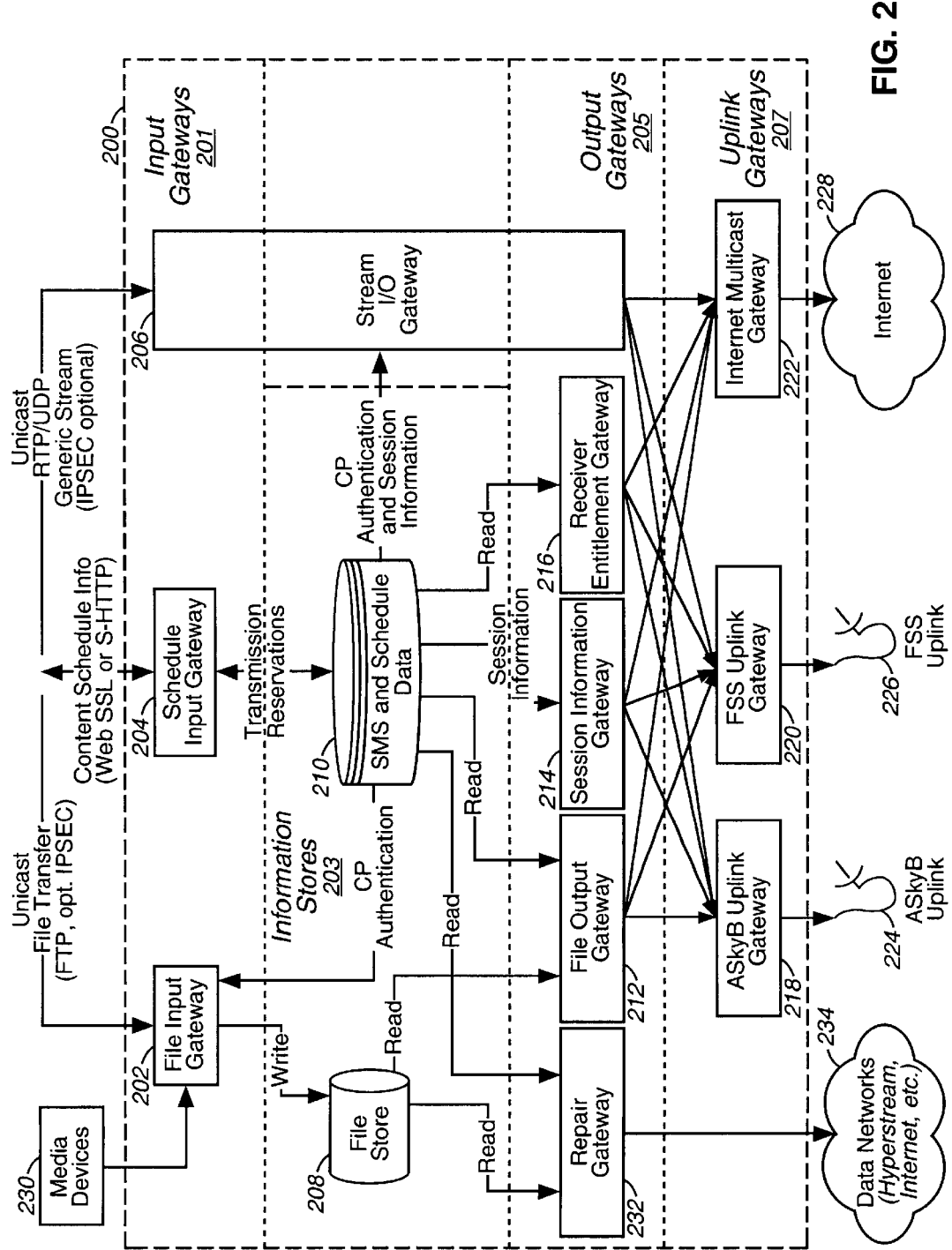
FIG. 2 is a diagram of an operations center (OC) in accordance with a preferred embodiment of the present invention.

With reference now to FIG. 2, a diagram of an operations center (OC) is depicted in accordance with a preferred embodiment of the present invention. In accordance with a preferred embodiment of the present invention, OC 200 contains a multicast server system. In delivering or transmitting data from CPs to content consumers, OC 200 includes input gateways 201, information stores 203, output gateways 205, and uplink gateways 207.

In the depicted example, OC 200 receives data from a CP from input gateways 201. These input gateways include a file input gateway 202, a schedule input gateway 204, and a stream input/output gateway 206. Data from file transfers are received at file input gateway 202 while scheduling information for data is received at schedule input gateway 204. Generic streaming data is received at stream input/output gateway 206. OC 200 also includes information stores 203 in the form of file store 208 and subscriber management system and schedule database 210. These information stores include all schedule and subscription information and all store and forward files. OC 200 also includes a number of output gateways 205: stream input/output gateway 206, file output gateway 212, session information gateway 214, and receiver entitlement gateway 216.

These output gateways deliver file and stream data, entitlement messages, program guides, and session information to the uplink gateway 207, which, in the depicted example, include: ASkyB gateway 218, FSS uplink gateway 220, and Internet multicast gateway 222. The uplink gateways are protocol translators specifically designed to output data from OC 200 in a format acceptable to an uplink facility to which they may be connected. In the depicted example, ASkyB uplink gateway 218 is connected to a ASkyB uplink 224, FSS uplink gateway 220 is connected to FSS uplink 226, and Internet multicast gateway 222 is connected to Internet 228. File input gateway 202 also may receive data from file transfers through media devices 230. In turn, the data is transferred to file store 208 by file input gateway 202. Additionally, repair gateway 232 is connected to data networks 234. Data networks 234 may include networks, such as, hyper-stream and the Internet. Repair gateway 232 reads data blocks from file store 208 to satisfy error recovery requests.

Still with reference to FIG. 2, file input gateway 202 is a target for all store and forward file data received from various CPs. Data arrives at file input gateway 202 via a file transfer protocol (FTP) or other file transfer mechanisms known to those of ordinary skill in the art. IP security protocol (IPSEC), secure sockets layer (SSL), or secure hypertext transport protocol (S-HTTP) are examples of mechanisms that may be used for the protection of the data transfer. File input gateway 202 includes functions similar to that of an FTP proxy gateway, passing data through the gateway with minimal interaction once validation has occurred. Schedule input gateway 204 allows a CP to interact with subscriber management system (SMS) and schedule database 210. A CP desiring to deliver a file through file input gateway 202 is authenticated with file input gateway verifying CP authentication through querying SMS and schedule database 210. Schedule input gateway 204 provides an interface to a CP to schedule new transmissions and to review and revise an existing schedule. Next, stream input/output gateway 206 is the recipient for all streaming data from CPs. The desired functionality to this gateway is similar to a FTP proxy gateway (Internet Protocol Circuit Gateway) passing through the gateway with minimal action once validation has occurred. Data passing through this gateway is authenticated, the destination route is specified, and then immediately transmitted.

The information stores contain all schedule and subscriptions information and all store and forward files. In particular, file store 208 receives authenticated data arriving from a CP. File store 208 temporarily stores data for later scheduled transmissions to CPs. Additionally, file store 208 may accept data input from media devices 230, which may be, for example, in the form of CD, tape, and video disks media sources. These media sources may arrive from CPs via a non-communications network delivery. A file stored within file store 208 is associated with a unique identifier in the depicted example in which the unique identifier is referenced when scheduling a transmission event.

SMS and schedule database 210 contains time-relative transmission information used by the input and output gateways to identify and manage transmission of data. SMS and schedule database 210 is queried by schedule gateway 254 to present a CP with current schedules and available resources. Data writes are made to SMS and schedule database 210 to schedule or revise a transmission event. A transmission event is the transmission of content. This database is also used by the input gateways to prepare for and authenticate incoming data or CP interactions. Output gateways use SMS and schedule database 210 to schedule output actions and provide entitlement information. SMS and schedule database 210 also includes access control information that controls input data acceptance and output data destination. Schedule input gateway 254 inputs and revises destination group information. The input gateways query this database to authenticate data arriving at the gateway.

With respect to the output gateways within OC 200 in FIG. 2, stream input/output gateway 206 immediately transmits data received at the input of this gateway to the uplink gateways. File output gateway 212 delivers staged data to the uplink gateways. File output gateway 212 uses file source and timing directions from SMS and schedule database 210. The data destination information is provided by queries to this database. Session information gateway 214 generates programming guide information for content consumers. This information is transmitted to content consumers through the uplink gateways. Receiver entitlement gateway 216 generates entitlement information controlling which reception facilities would be allowed to decode each transmitted stream. This information is obtained by querying SMS and schedule database 210 for destination, conditional access, and transmission scheduling information.

Figure 3:
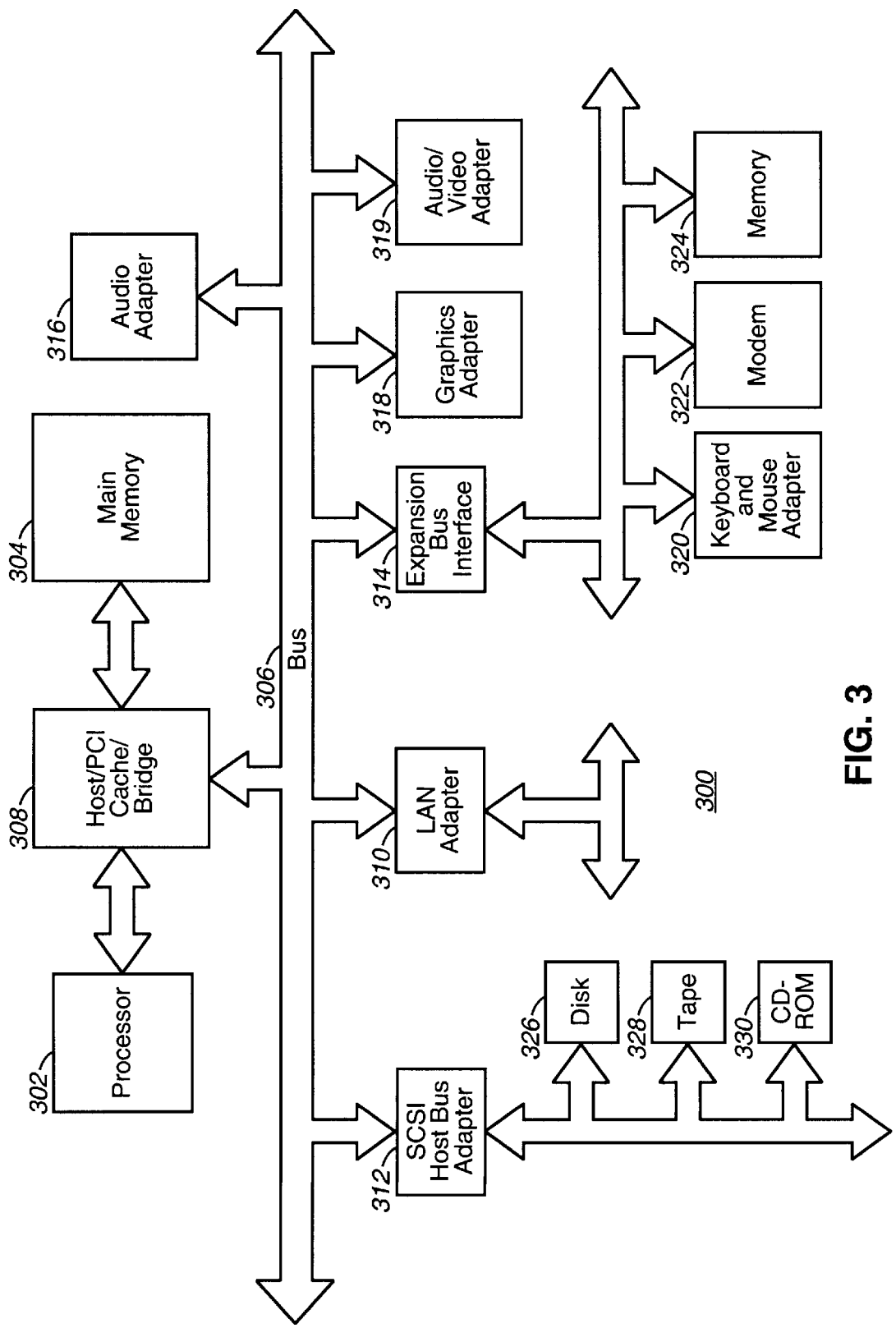
FIG. 3 is a block diagram of a data processing system in which the present invention may be implemented.

Turning next to FIG. 3, a block diagram of a data processing system 300 in which the present invention may be implemented is illustrated. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. The depicted example includes four loads on the motherboard and three expansion slots. Those of ordinary skill in the art will appreciate that the hardware in FIG. 3 may vary. For example, other peripheral devices, such as optical disk drives and the like may be used in addition to or in place of the hardware depicted in FIG. 3. The depicted example is not meant to imply architectural limitations with respect to the present invention.

Figure 4:
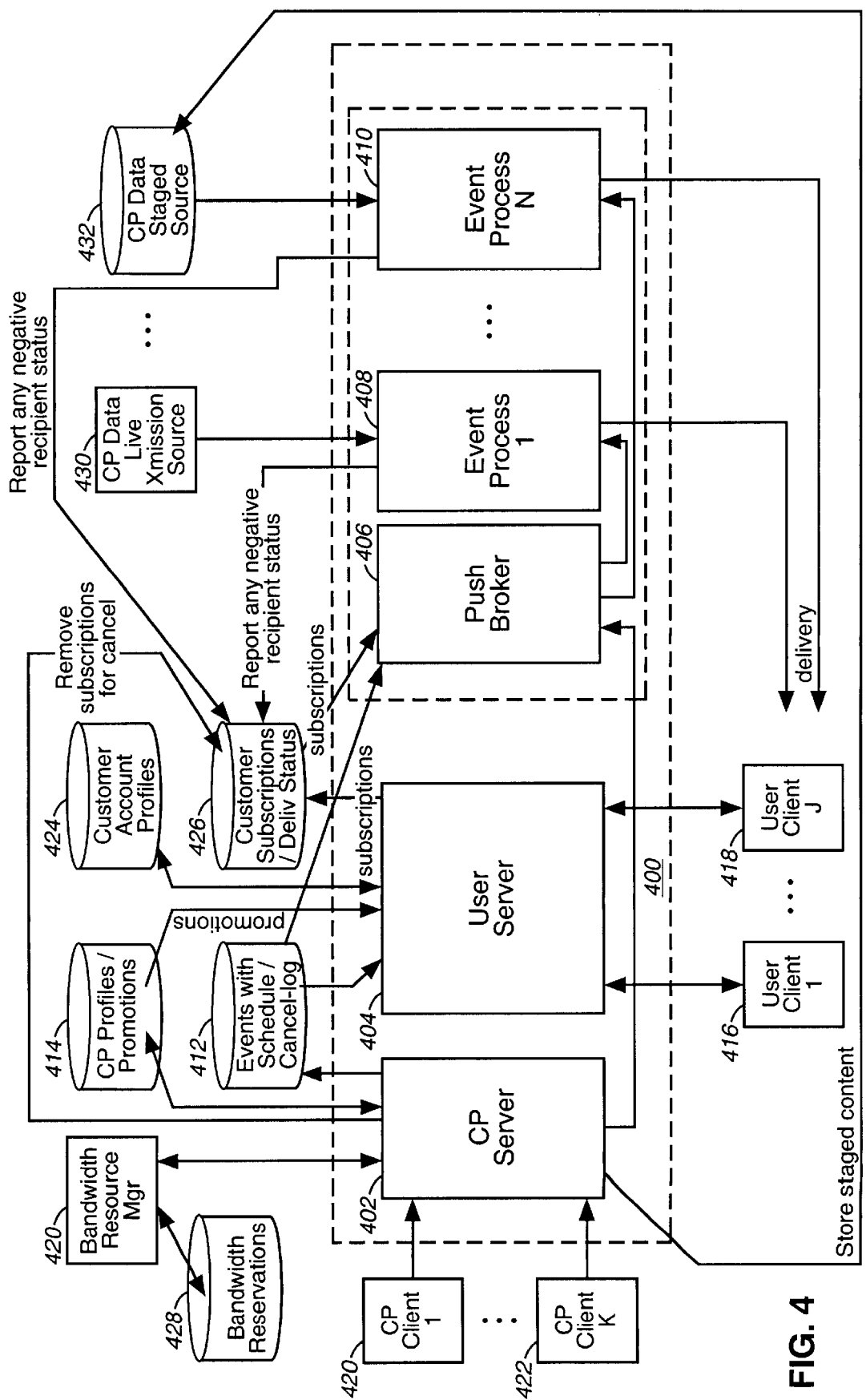
FIG. 4 is a fictional block diagram of a server in an operations center in accordance with a preferred embodiment of the present invention.

With reference now to FIG. 4, a functional block diagram of a server in an operations center is depicted in accordance with a preferred embodiment of the present invention. Server 400 in this figure provides an interface to CPs and content consumers for managing the delivery of data, also referred to as "content", to content consumers. Content consumers are able to order a viewing of content, such as, for example, a video broadcast, a power point presentation, a CD soundtrack, or a data file. The order may be made according to a prescheduled for a delivery of a particular media by a particular CP. Media may be "pushed" to a set of registered customers, by, or through processes implemented within server 400. Server 400 contains a number of server processes, including a CP server 402, a user server 404, a push broker 406, and event processes 408 and 410. These server processes also are referred to collectively as a "multicast server". The server processes may be executing on a data processing system, such as data processing system 300 in FIG. 3. Alternatively, the server processes may be operating on different data processing systems. For example, CP server 402 and user server 404 may be located in one data processing system while push broker 406, event processes 408, event process 410 may be located in a different data processing system. In the depicted example, a single server process, which contains multiple threads, services all clients to server 400. In such a situation, the server processes/threads are appropriately synchronized to any shared data. In the depicted example, server processes operate in multitasking operating systems, such as Windows NT or OS/2, or MVS/CICS.

CP server 402 allows a CP to manage delivery of content. This content may take many forms as previously mentioned. For example, content also may be in the form of advertising media that is scheduled for delivery to content consumers, such as user client 416 and user client 418, which are clients of server 400. In particular, a CP may schedule delivery of content or cancel such delivery. This information is stored within database 5 412. In the depicted example, a CP profile exists for CPs, such as CP client 420 and CP client 422, which are registered to scheduled delivery of content. This information is stored within CP profiles/promotions database 414. Additionally, CP profiles/promotions database 414 also may contain promotional material, which is made available to anyone who accesses user server 404. Alternatively, a server process other than CP server 402 may be implemented to authenticate CPs who are clients of server 400.

In making determinations, CP server 400 interfaces with bandwidth resource manager 420 for reserving data transmission bandwidth on appropriate resources at the appropriate time for an appropriate duration. Bandwidth resource manager 420 is a process that determines how to allocate (static or dynamic) utilization of necessary communications links, such as trunks for managing data transfer. Bandwidth resource manager 420 also analyzes other factors, such as for example, the storage space available for storing the content (if needed) and the processing of the content that is required to deliver the content to the content consumers in addition to the number and types of connections or communications needed to deliver the content to content consumers. The reservations of bandwidth are stored in bandwidth reservation database 428. The utilization of the communications links may be, for example, in the form of short bursts of short data packets or ongoing bursts of short data packets.

With these processes, a CP may specify a scheduled content as live or staged. Live content implies that the CP is responsible for transmission of the content to push broker 406 in server 400. This type of transmission or delivery of content is a live event. Staged content implies that the content is stored by CP server 402 for origination or transmission by push broker 406. This type of transmission or delivery of content is a staged event.

Additionally, server 400 provides content consumers, user client 416 and user client 418, access to content provided by client PCs establishing communications links to server 400. Authorized content consumers are verified by user server 400 who queries to customer account profiles database 424. Authorized content consumers are registered for content, which is advertised. An "order" is embodied as a user subscription that is saved in customer subscriptions/delivery status database 426 as a result of the order. A variety of authorization scenarios, such as, for example, credit card validation, 900 number account activation, and e-mail reply with key known to those skilled in the art may be employed. User account profile also is maintained in customer profile database 424.

Subscriptions by content consumers are maintained historically except when a content consumer cancels a scheduled delivery of content. In response to cancellation of content, CP server 402 removes subscriptions for cancelled content from customer subscriptions/delivery status database 426. Additionally, a cancellation log is created. This historical collection of subscription information allows tracking of what content consumers ordered, actually consumed, and any problems that may have occurred.

Push broker 406 actually manages delivery of content from CPs to content consumers. Push broker 406 provides intermediate communications points through spawning one or more event processes for live content. Additionally, push broker 406 originates data transmission to customers for staged content through spawning one or more event processes. Push broker 406 may invoke local event processes or remote event processes. Remote event processes are invoked remote procedure calls. Customer subscriptions within customer subscriptions/delivery status database 426 by push broker 406 to determine the status of content consumers. Push broker 406 accesses this database to determine whether errors have occurred, such as, for example, a content consumer not receiving a scheduled content.

In the depicted example, event process 408 sends live content to a user client from CP data live transmission source 430 while event process 410 sends staged content to a user client from CP data staged source 432. CP data staged data source 432 in the depicted example is a file store, such as file store 208 in FIG. 2. The individual event processes manage specific status for a particular customer. In this manner, the present invention provides an interface to CPs and content consumers to facilitate efficient management of delivery of content. Additionally, the present invention employs a push broker that manages both live and staged content delivery to content consumers. To avoid obscuring the present invention, the depicted example illustrates only two CP clients, two event processes, two user clients, a single live transmissions source, and a single CP staged data source. Those of ordinary skill in the art will realize that other numbers of these components along with other processes not shown may employed in accordance with a preferred embodiment of the present invention.

Figure 5:
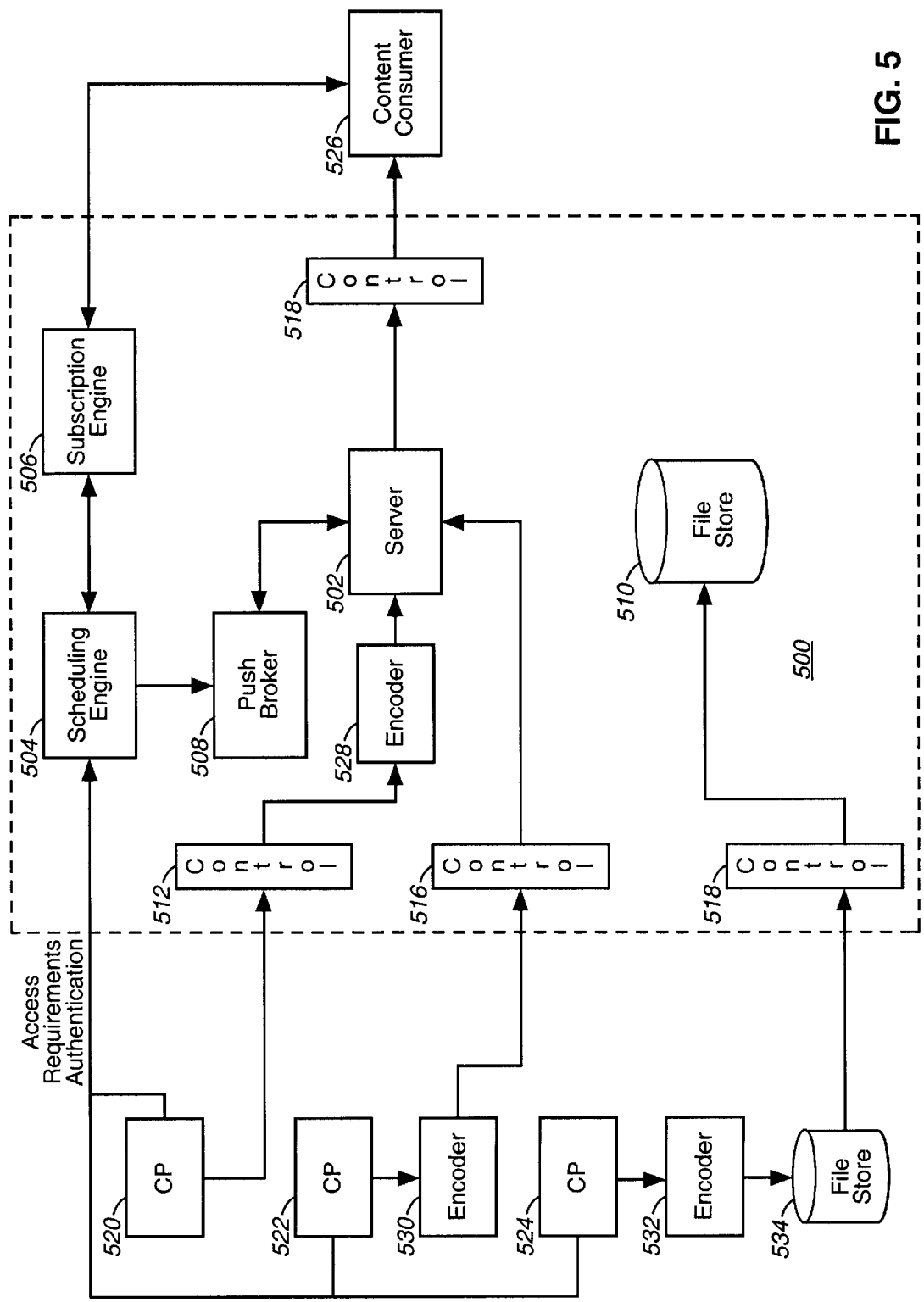
FIG. 5 is a functional block diagram of a communications system in accordance with a preferred embodiment of the present invention.

Turning to FIG. 5, a functional block diagram of a communications system is depicted in accordance with a preferred embodiment of the present invention. System 500 is a functional block diagram of the principal components, which provide the functionality of an operations center. In the depicted example, system 500 includes server 502, a scheduling engine 504, a subscription engine 506, and a push broker 508. System 500 also contains a file store 510 that serves as a repository for content that is to be "pushed" to a content consumer. System 500 also includes controls 512, 514, and 516. These controls are implemented as input gateways 201 in FIG. 2. Control 518 is implemented as output gateways 205 in FIG. 2.

CP 520 and CP 522 provide data, also referred to as "content", which is sent to server 502. This data is live data in the sense that the data is streamed to content consumers as is received at server 502. CP 524 sends staged data, which is data sent in the form of a file to system 500 for storage in file store 510 prior to being sent to a content consumer, such as content consumer 526. The sending of content is referred to as an "event".

Data may be encoded after being received by system 500 as in the case of CP 520 in which data is encoded by encoder 528, located within system 500. Alternatively, encoding may occur prior to sending data to system 500. This situation is found with CP 522, which sends data through encoder 530 before being received by system 500. Similarly, CP 524 encodes data in encoder 532, which in turn sends the data to a file store 534, external to system 500. The data is then sent to system 500 by a transfer protocol such as, for example, FTP.

The reception of data from CP 520, CP 522, and CP 524 by system 500 is controlled by controls 512, 514, and 516, respectively. These controls serve to control access to system 500. In other words, controls 512, 514, and 516 determine if you are a valid CP for system 500 and whether you can send data to system 500 at the time the CP attempts to send data to system 500. The reservation of time slots and/or bandwidth for sending data to system 500 made by CPs 512–516 is made by interfacing with scheduling engine 504. This scheduling process is described in more detail in FIG. 6 below. The reception of data by content consumer 526 is controlled by control 518. Content consumer 526 interfaces with subscription engine 506 to order content from system 500. Additionally, subscription engine 506 provides content consumer 526 programming information. The interface between subscription engine 506 and a content consumer, such as content consumer 526, are described in more detail in FIG. 7 below.

With respect to "pushing" content to a content consumer from file store 510 by a server, push broker 508 controls the sending of content by server 502 to content consumer 526. The processes associated with push broker 508 are described in more detail below in FIG. 10 and FIG. 11.

Figure 6:
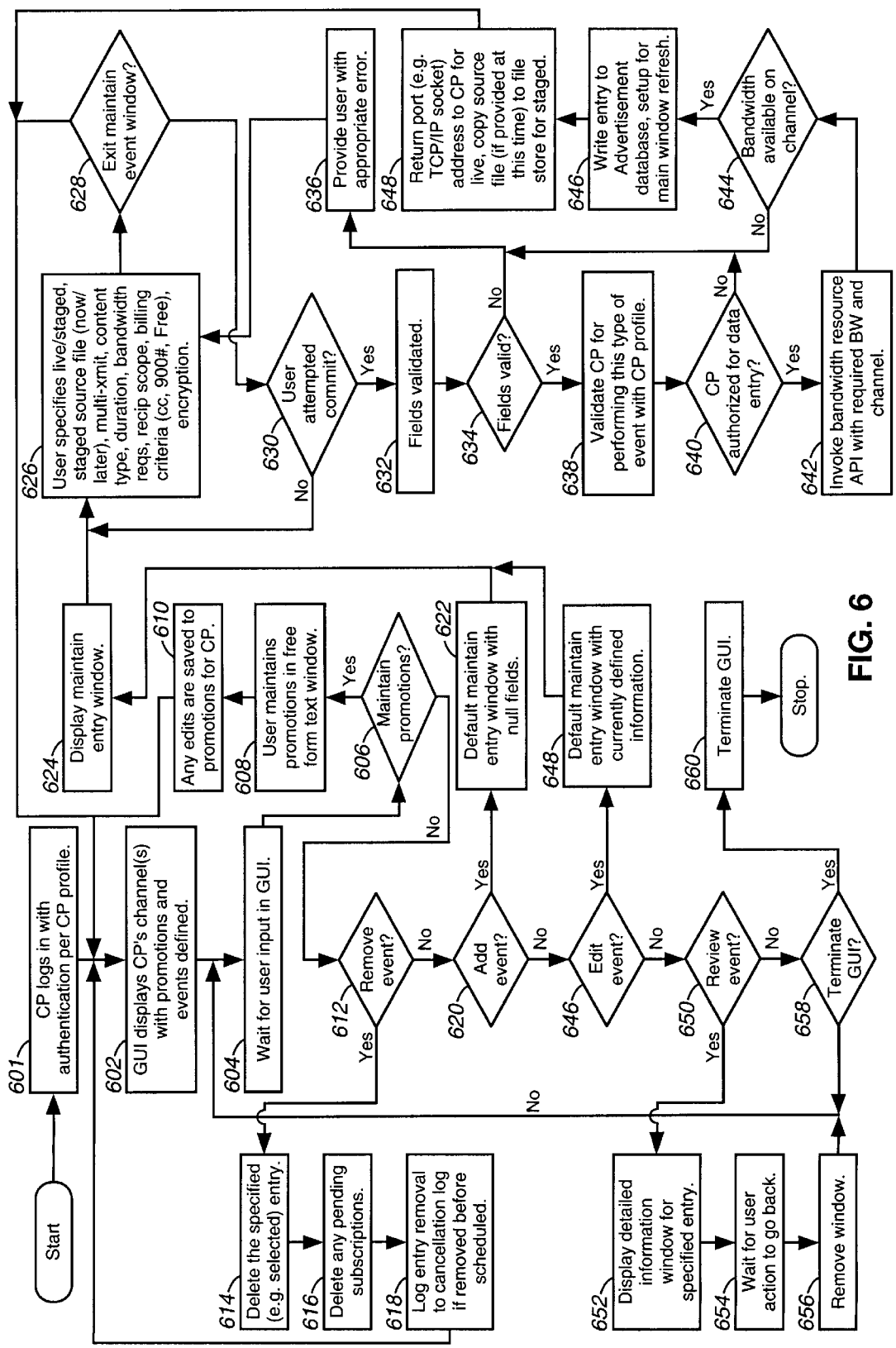
FIG. 6 is a flowchart of a process for a content provider interface in accordance with a preferred embodiment of the present invention.

With reference now to FIG. 6, a flowchart of a process for a CP interface is illustrated in accordance with a preferred embodiment of the present invention. The process beings with a CP logging with authentication of the CP occurring based on a CP profile stored within the server (step 600). The graphical user interface (GUI) displays the CP's channel or channels with promotions and events defined (step 602). These events are scrollable. The GUI provides the user with a number of selections including maintain promotions, remove an event, add an event, edit an event, review an event, or terminate.

The process waits for user input in the GUI (step 604). Upon detecting user input with the GUI, a determination is made as to whether input is to maintain promotions (step 606). A promotion is content, such as a commercial, a preview of upcoming content, or other informational data used to occupy the system in appropriate intervals between scheduled content. The user at the CP has decided to maintain promotions, the process then provides a free form window in which the user maintains promotions (step 608). Afterwards, edits are saved to promotions for the CP (step 610) with the process then returning to step 602. With reference again to step 606, if the user does not choose to maintain promotions, the process then determines whether the user action in the GUI is to remove an event (step 612). If the user has chosen to remove an event, the specified entry is removed (step 614). The event may be specified in a number of ways in the GUI including selection by a mouse-controlled pointer. Pending subscriptions to the event are then deleted (step 616), and the removal of the event is logged to a cancellation log if the scheduled event is removed before it is delivered (step 618). The process then returns to step 602 as described above.

With reference again to step 612, if the user interaction with the GUI is not to remove an event, a determination is then made as to whether the user has decided to add an event (step 620). If the user has decided to add an event, a default maintain entry window with null entry fields is selected (step 622), and displayed to the user (step 624). Thereafter, input from the user is received specifying details of the event (step 626). These details include whether the event is live/staged, staged source file (now/later), multiple transmissions, content type, duration, bandwidth requirements, recipient scope, billing criteria (i.e., credit card, 900 number, free), and encryption. The content type also may specify whether a content consumer can record the content. In the depicted example, if the content is to be encrypted, the CP may provide a key or the push broker can perform the type of encryption specified (i.e., key generated). A determination is made as to whether the user input indicates that the user has decided to exit the "maintain event" window (step 628). A determination that the use has decided to exit the maintain event window results in the process returning to step 602 as described above. On the other hand, if the user has not decided to exit the "maintain event" window, a determination is made as to whether the user has finished making changes to the "maintain event" window (step 630).

If the user has not finished, the process then returns to step 626 as described above. Otherwise, field validation is performed (step 632). A determination is then made as to whether the fields specified by the user are valid (step 634). If the fields are not valid, the user is proved with an appropriate error message (step 636) with the process then returning to step 626. Otherwise, the CP is validated to determine whether the CP can perform this type of event using a CP profile or database (step 638). A determination is made as to whether the CP is authorized for the data entry (step 640). If the CP is authorized, a bandwidth resource API is invoked using the bandwidth and channel specified by the user (step 642). A determination is then made as to whether the required bandwidth is available on the specified channel (step 644). The bandwidth availability determination includes whether static or dynamic utilization of necessary communications links, such as trunks for managing data transfer is available in addition to other bandwidth factors, such as for example, the storage space available for storing staged content and the processing of the content that is required to deliver the content to the content consumers. If the bandwidth is not available, the process then proceeds to step 636, as previously described. Otherwise, an entry is written to the advertisement database and the entry becomes visible in the consumer interfaces (step 646). Next, for live content, a port address (i.e., a TCP/IP socket) is returned to the CP for live content, and for staged content, the source file, if available, is copied to the file store (step 648) with the process then returning to step 602.

With reference again to step 620, if the user has not indicated a desire to add an event, a determination is made as to whether an event is to be edited (step 646). If an event is to be edited, the process then selects a default maintain entry window containing currently defined information (step 648) and displays the window to the user (step 624) with the process then proceeding to step 626 in the manner previously described. With reference again to step 646, if the event is not to be edited, the process then determines whether a specified event is to be reviewed (step 650). If the event is to be reviewed, a detailed information window for the specified entry is displayed to the user (step 652). Afterwards, the process waits for user action to go back (step 654). Upon detecting user action to go back, window is removed (step 656) and the process returns to step 604 to wait for user input.

With reference again to step 650, if the user input does not indicate that an event is to be reviewed, a determination is then made as to whether the user input is for a termination of the GUI (step 658). If the GUI is not to be terminated, the process returns to step 604 to wait for user input. Otherwise, the GUI is terminated (step 660) with the process terminating thereafter.

Figure 7:
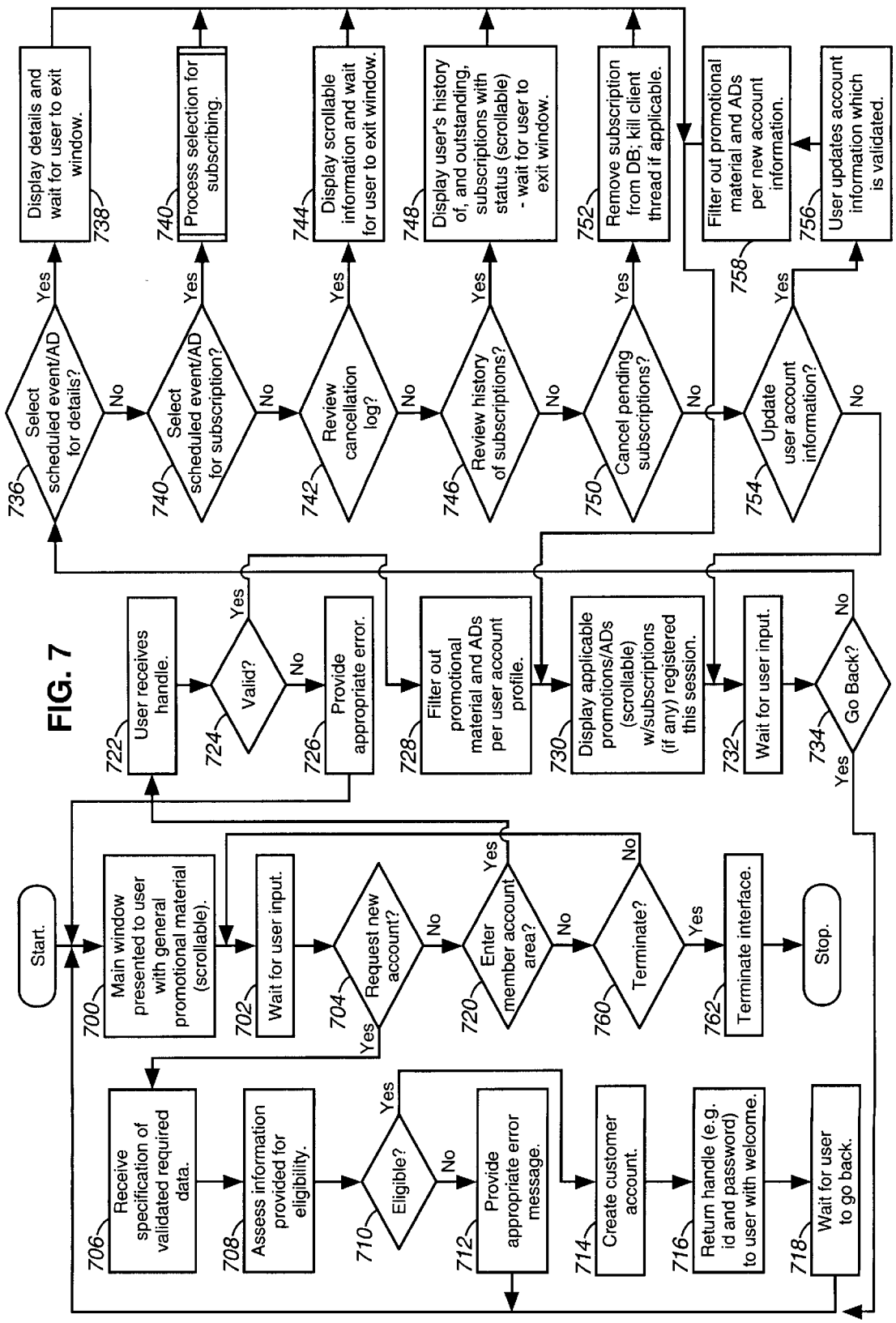
FIG. 7 is a flowchart of a process for a content consumer interface in accordance with a preferred embodiment of the present invention.

Turning next to FIG. 7, a flowchart of a process for a content consumer interface is depicted in accordance with a preferred embodiment of the present invention. The process provides an interface to a content consumer, which is in the form of GUI. In particular, a GUI may be a series of web pages that is accessed by the content consumer. These web pages are dynamically altered to request and present information to a CP as described with respect to FIG. 7. The process begins by presenting a main window to a user, content consumer, in which the window contains general promotional material (step 700). This material is scrollable within the window as a part of a GUI for interaction with a user. The process then waits for user input (step 702). Upon user input occurring, the process determines whether the user input is to request a new account (step 704). If a new account is requested by the user input, the specification of the validated required data from the user is received (step 706). The information is assessed for eligibility (step 708). This assessment may require further input from the user. A determination is made as to whether the user is eligible for a new account (step 710). If the user is not eligible, an appropriate error message is sent to the user (step 712) with the process then returning to step 700. Otherwise, a customer account is created (step 714). A handle is returned to the user (step 716). This handle may include, for example, an id and a password. The process then waits for the user to go back (step 718) with the process returning to step 700 when the user goes back to the previous window.

Turning to step 704, if the user input does not request a new account, a determination is made as to whether the member account area is to be entered (step 720). If the member area is to be entered, the user handle is received from the user (step 722). A determination is made as to whether the user handle is valid (step 724). If the user handle is not valid, the process then provides an appropriate error message to the user (step 726) and returns to step 700. If on the other hand, the handle is valid, promotional materials and advertisements are filtered out based on an account profile for the user (step 728). Next, the applicable promotions and/or advertisements are displayed to the user with any subscriptions to events registered during the session (step 730). The process then waits for user input (step 732). Upon detecting user input, the process then determines whether the user input is to go back (step 734). If the user input is to go back, the process then proceeds to step 700 as described above. Otherwise, a determination is made as to whether the user input requests more details for a selected scheduled event or advertisement (step 736). If the user request more details, the process displays these details and waits for the user to exit the window in which the details are displayed (step 738) with the process returning to step 730 after the user exits the window.

With reference again to step 736, if the user does not request more details, a determination is made as to whether the user has selected a scheduled event or advertisement for subscription (step 740). If the user has selected an event or advertisement for subscription, the selection is then processed for subscribing (step 740) with the process then returning to step 730, as previously described. If in step 740, the user has not selected an event or schedule, a determination is made as to whether the user has requested the cancellation log for review (step 742). If the user has requested to review the cancellation log, the process then displays the cancellation log information in scrollable form in a window and waits for the user to exit this window (step 744). When the user exits the window, the process then returns to step 730.

Turning again to step 742, if the user has not selected the cancellation log for review, a determination is made as to whether the user has requested to review the history of subscriptions (step 746). If the user request the history of subscriptions, the user's history of and outstanding subscriptions with status are displayed to the user in scrollable form in a window until the user exits the window (step 748). Upon exiting the window, the process returns to step 730. If in step 746, the user has not requested a review of the history of subscriptions, a determination is made as to whether the user has cancelled any pending subscriptions (step 750). If the user has cancelled a pending subscription, the process removes the subscription from the database and terminates the client thread or process if one has been spawned for the user (step 752) with the process returning to step 730. If on the other hand, the user has not cancelled the subscription, the process then determines whether the user desires to update user account information (step 754). If the user desires to update information, the process then receives user updates to account information, which also is validated (step 756). Promotional material and advertisements are then filtered out according to the new account information (step 758) with the process returning to step 730 as previously described.

With reference back to step 720, if the user has not entered the member account area, the process then determines if the user has indicated a desire to terminate the interaction (step 760). If the user has decided to terminate, the interface with the user is then terminated (step 762) with the process ending thereafter. Otherwise, the process proceeds to step 722 as described above.

Figure 8:
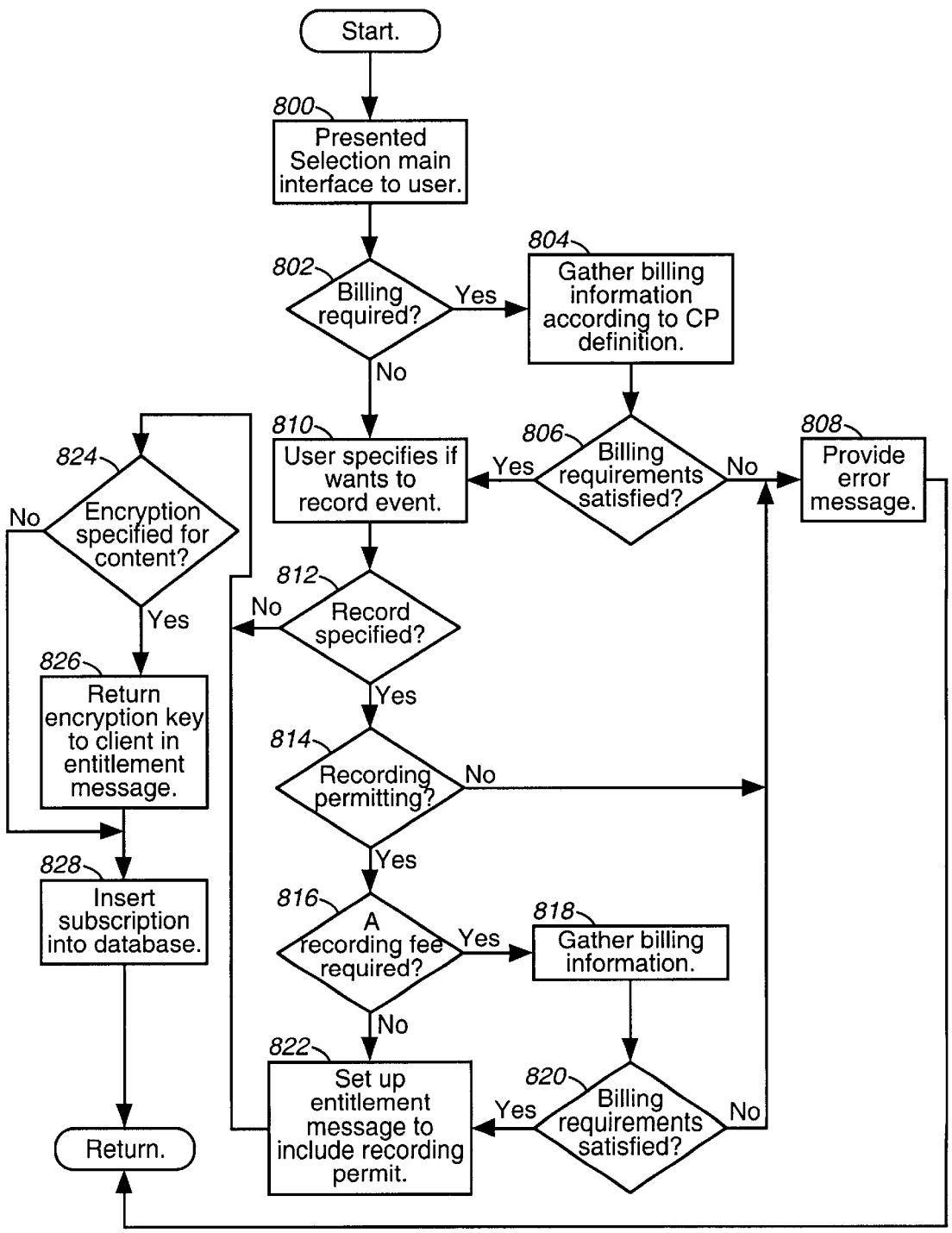
FIG. 8 is a flowchart of a process for subscribing to an event in accordance with a preferred embodiment of the present invention.

With reference now to FIG. 8, a flowchart of a process for subscribing to an event is depicted in accordance with a preferred embodiment of the present invention. The process provides an interface to a content consumer, which is in the form of GUI. In particular, a GUI may be a series of web pages that is accessed by the content consumer. These web pages are dynamically altered to request and present information to a CP as described with respect to FIG. 8. This process is initiated when a user has selected content for subscription. The process begins by presenting the selection main interface to the user (step 800). A determination is then made as to whether billing is required for the selection made by the user (step 802). If billing is required, the process then gathers billing information through the interface according to the CP definition and specification (step 804). Thereafter, a determination is made as to whether the billing requirements have been satisfied (step 806). If the billing requirements have not been satisfied, the process provides an error message (step 808) with the process terminating.

If the billing requirements have been satisfied, the process then receives input as to whether the user wants to record the event (step 810). This step also is executed directly from step 802 if no billing is required for the selection made by the user. A determination is then made as to whether the user has indicated it wants to record the event (step 812). If the user decides to record the event, a determination is made as to whether recording of the event is permitted (step 814). If recording is not permitted, the process proceeds to step 808 to present the user with an error message. Otherwise, a determination is made as to whether a recording fee is required. If a recording fee is required, the process gathers recording information through the interface with the user (step 818). A determination is then made as to whether billing information has been satisfied by the gathered information (step 820). If the billing requirements have not been satisfied, the process proceeds to step 808. Otherwise, an entitlement message is set up to include permission to record the content (step 822). The process also proceeds to step 822 to allow recording if a recording fee is not required in step 816.

Thereafter, a determination is made as to whether encryption has been satisfied for the content (step 824). If encryption has been specified, an encryption key is returned to the user in the entitlement message (step 826). Thereafter, a subscription is inserted into the database (step 828) with the process terminating thereafter. With reference again to step 824, if encryption is not specified, the process proceeds to step 828.

After the subscription has been inserted into the database and the process terminates, depending on the type of content to be delivered to the user, a thread will be spawned in anticipation of delivery of the content to the user or the user may be required to manually prepare the interface at the appropriate to receive the content.

Figure 9:
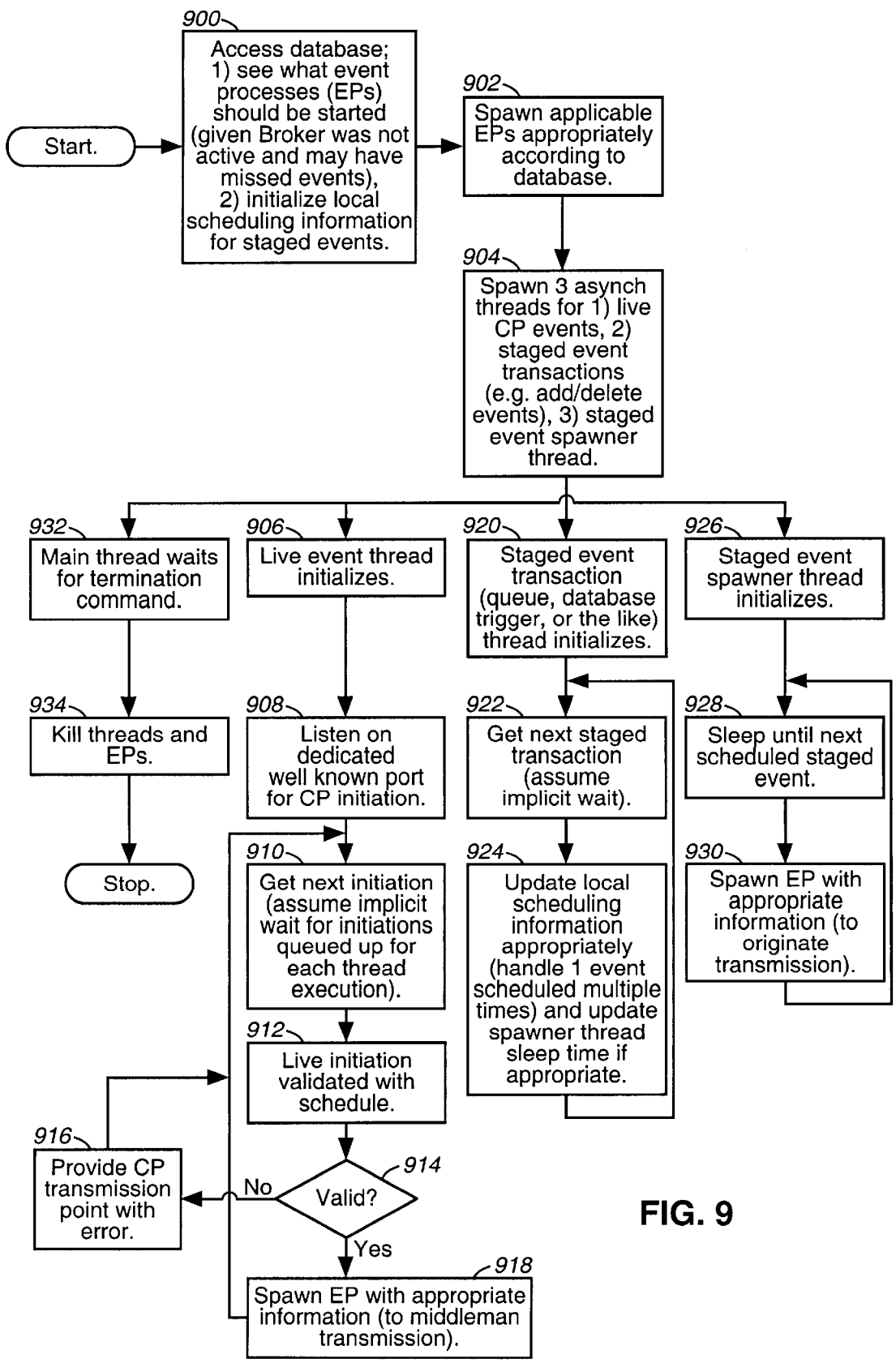
FIG. 9 is a flowchart of a process for a push broker in accordance with a preferred embodiment of the present invention.

Turning next to FIG. 9, a flowchart of a process for a push broker is illustrated in accordance with a preferred embodiment of the present invention. The process begins by accessing the database to see what event processes should be started given the push broker was not active and may have missed events along with initializing local scheduling information for staged events (step 900). Thereafter, the process spawns applicable event processes according to information derived from the database (step 902). This information is derived from a database, such as database 412 in FIG. 4. The process then spawns three asynchronous threads: 1) live event thread, 2) staged event thread, and 3) staged event spawner thread (step 904). As used herein, a "process" is a sequence of steps or things done while a "thread" is a path through a process. A process may have multiple threads in which each thread may take a different path through the steps making up the process.

Still referring to FIG. 9, a live event thread initializes (step 906). The thread monitors a dedicated port for CP initiation (step 908). Thereafter, the live event thread obtains the next initiation by a CP (step 910). This step assumes that the thread waits for initiations that are queued for the thread to process. Next, the initiation is validated with the schedule (step 912). A determination is then made as to whether the initiation is valid (step 914). If the initiation is not valid, the process then provides the CP with an error message (step 916) with the process then returning to step 910. If the initiation is valid, an event process is spawned with appropriate information to deliver the content to content consumers (step 918) with the process returning to step 910.

From step 904, a staged event transaction thread is initialized at the same time the live event thread is initialized (step 920). This initialization may involve the use of a queue, database trigger or the like. The next stage transaction is obtained (step 922). Thereafter, local scheduling information is updated appropriately and the spawner thread sleep time is updated if appropriate (step 924). The update information may include information such as, for example, whether an event is scheduled multiple times. Thereafter, the process returns to step 922. From step 904, a staged event spawner thread is initialized at the same time the live event thread the staged event thread is initialized (step 926). The thread sleeps until the next scheduled staged event (step 928). When the sleep time expires, an event process is spawned with appropriate information needed to originate transmission to content consumers (step 930) with the process then returning to step 928. From step 904, the main thread waits for a termination command (step 932). Upon receiving a termination command, the threads and event processes are terminated (step 934) with the process terminating thereafter.

Figure 10:
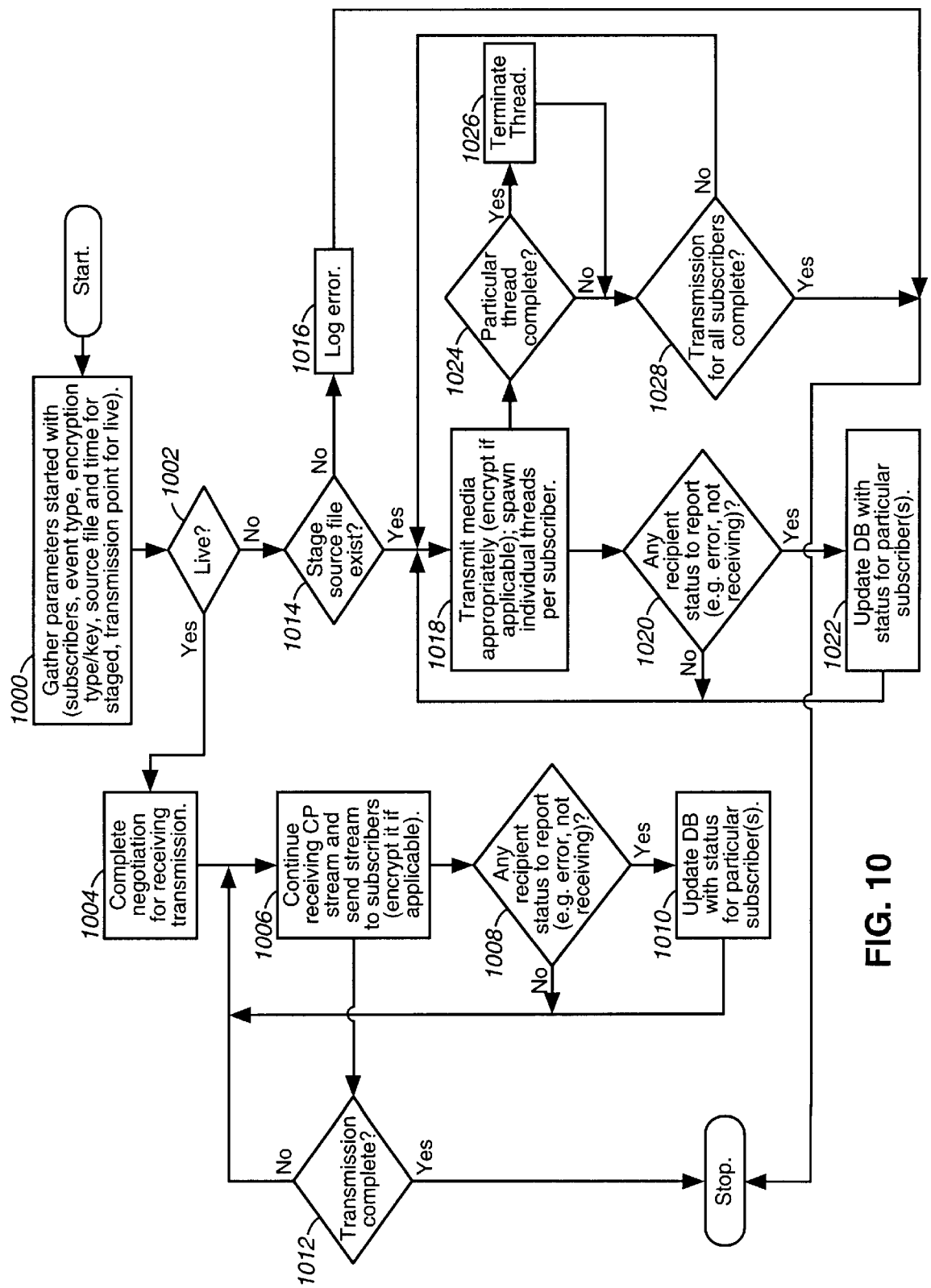
FIG. 10 is a flowchart of an event process in accordance with a preferred embodiment of the present invention.

Next in FIG. 10, a flowchart of an event process is depicted in accordance with a preferred embodiment of the present invention. In handling live and stage events, the event process controls the delivery of content to content consumers. The event process begins by gathering starting parameters, such as subscribers, content type, encryption type/key, source file, time for a staged event, and transmission point for a live event (step 1000). A determination is then made as to whether the content is live (step 1002). If the content is live, the process then completes negotiation for receiving transmission of the live content (step 1004). The process then continues to receive the CP data stream and sends the data stream to subscribers with encryption if applicable (step 1006). A determination is then made as to whether any recipient status is present to indicate whether errors have occurred or if a content consumer is not receiving an event that has been subscribed to by the content consumer (step 1008).

Thereafter, a database, such as customer subscriptions/delivery status database 426 in FIG. 4 is updated with the status with particular subscribers (step 1010), with the process returning to step 1006. The process also returns to step 1006 from step 1008 if a recipient status is not present for recording. From step 1006, the event process also determines if the transmission is complete at the same time status is being determined (step 1012), If the transmission is not complete, the process then returns to step 1006. Otherwise, the event process terminates.

With reference again to step 1002, if the content is not live, the event process determines whether a staged source file exists for the content (step 1014). If a staged source file does not exist, an error is logged (step 1016) with the event process terminating thereafter. If a stage source file exists, the process then transmits the data with encryption if and as applicable (step 1018). From step 1018, two determinations are made simultaneously. First, a determination is made as to whether recipient status is available for reporting (step 1020). If recipient status is present, the database is updated with the status for the particular subscribers (step 1022), with the process then returning to step 1018. At the same time the determination in step 1020 begins, a determination is made also as to whether a particular thread has completed execution (step 1024). If a thread has completed execution (transmission of content), the thread is then terminated (step 1026). Thereafter, a determination is made as to whether a transmission for all subscribers has completed (step 1028). If transmission has not completed for all subscribers, the process returns to step 1018. The process also proceeds to step 1028 from step 1024 if a thread has not completed execution. With reference again stop 1028, if transmission has completed for all subscribers, the event process terminates.

Figure 11:
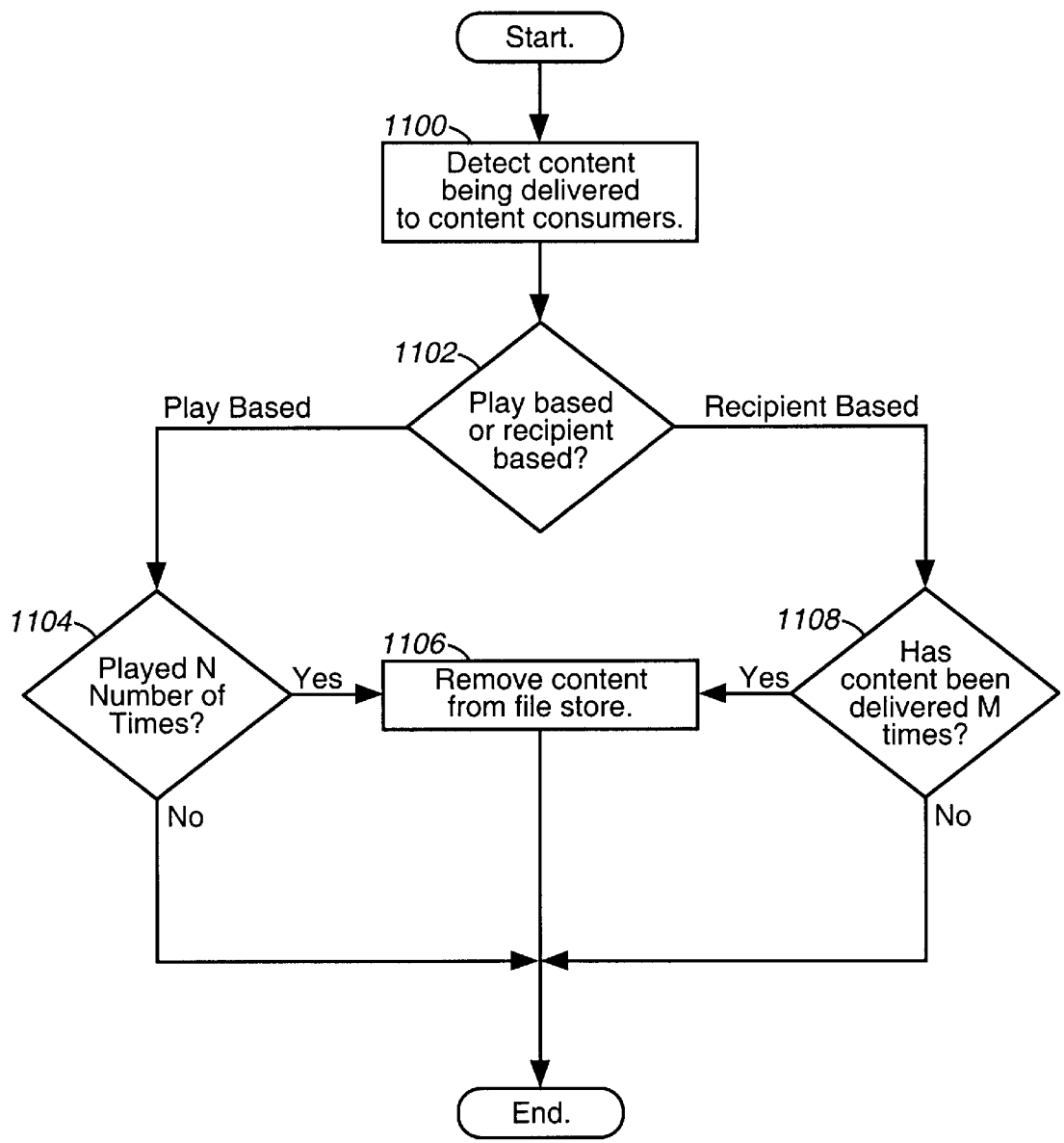
FIG. 11 is a flowchart of a process for managing content in a file store in accordance with a preferred embodiment of the present invention.

Turning now to FIG. 11, a process for managing content in a data store is depicted in accordance with a preferred embodiment of the present invention. The process begins by detecting content being delivered to content consumers from the file store (step 1100). A determination is made as to whether the content is play based or recipient based (step 1102). Play based content is maintained within a file store until the content has been played a selected number of times. Recipient based content is maintained within a file store until the content has been delivered to some number of recipients. If the content is play based, the process then determines whether the content has been played N number of times in which the selected number of times the content is to be played before the content is removed from the file store (step 1104). If the content has been played number of times, the content is removed from the file store (step 1006), with the process terminating thereafter. The process also terminates if the content has not been played N number of times. With reference again to step 1102, if the content is recipient based, the process then determines whether the content has been delivered to M number of recipients in which M is the number of recipients that the content is to be delivered to before the content is removed from the file store (step 1008). If the content has been delivered to M number of recipients, the process proceeds to step 1006 to remove the content from the file store. Otherwise, the process terminates.

Figure 12:
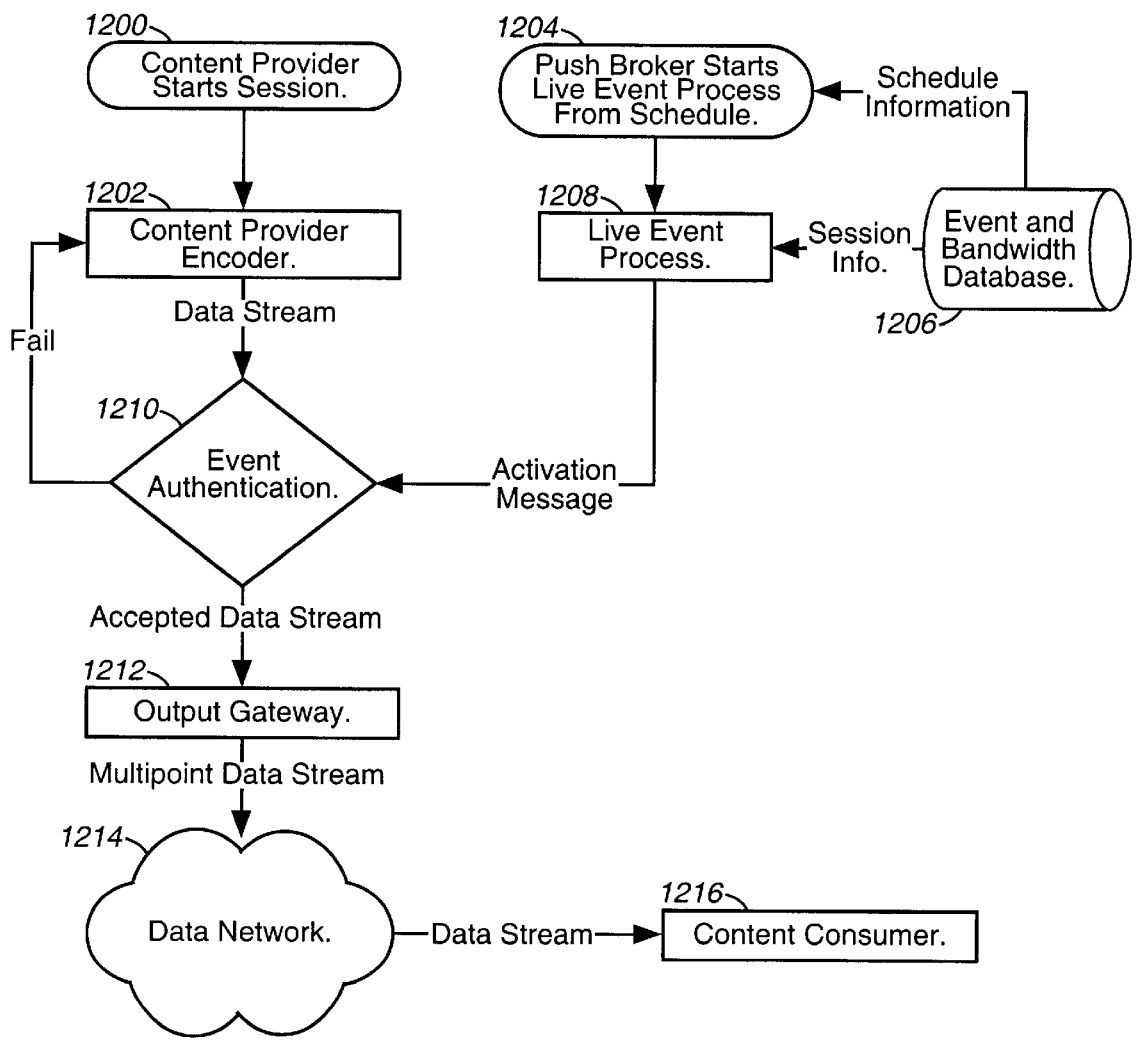
FIG. 12 is a data flow diagram showing the flow of content in a live session from a CP to a content consumer in accordance with a preferred embodiment of the present invention.

In FIG. 12, a data flow diagram showing the flow of content in a live session from a CP to a content consumer is depicted in accordance with a preferred embodiment of the present invention. CP 1200 starts a session and causes content provider encoder 1202 to encode content to be delivered to content consumers. Push broker 1204 starts a live event process 1206 from schedule information. This schedule information is derived from event and bandwidth database 1208. Live event process 1206 receives session information and sends an appropriate activation message to event authentication block 1210. The activation message is used to initiate activation procedures by event authentication block 1210. Additionally, information necessary to authenticate the incoming data stream is provided within the activation message. If the data stream sent by CP encoder 1202 is authenticated by the activation message, the accepted data stream is then sent to output gateway 1212, which may include a server and a splitter network. Output gateway 1212 sends a multipoint data stream to a data network 1214, which then transmits the data stream content consumers, such as content consumer 1216. Data network 1214 may be, for example, the Internet, a private satellite network, or a terrestrial network. If the data stream is not authenticated by authentication block 1210, a failure is returned to CP 1202.

Figure 13:
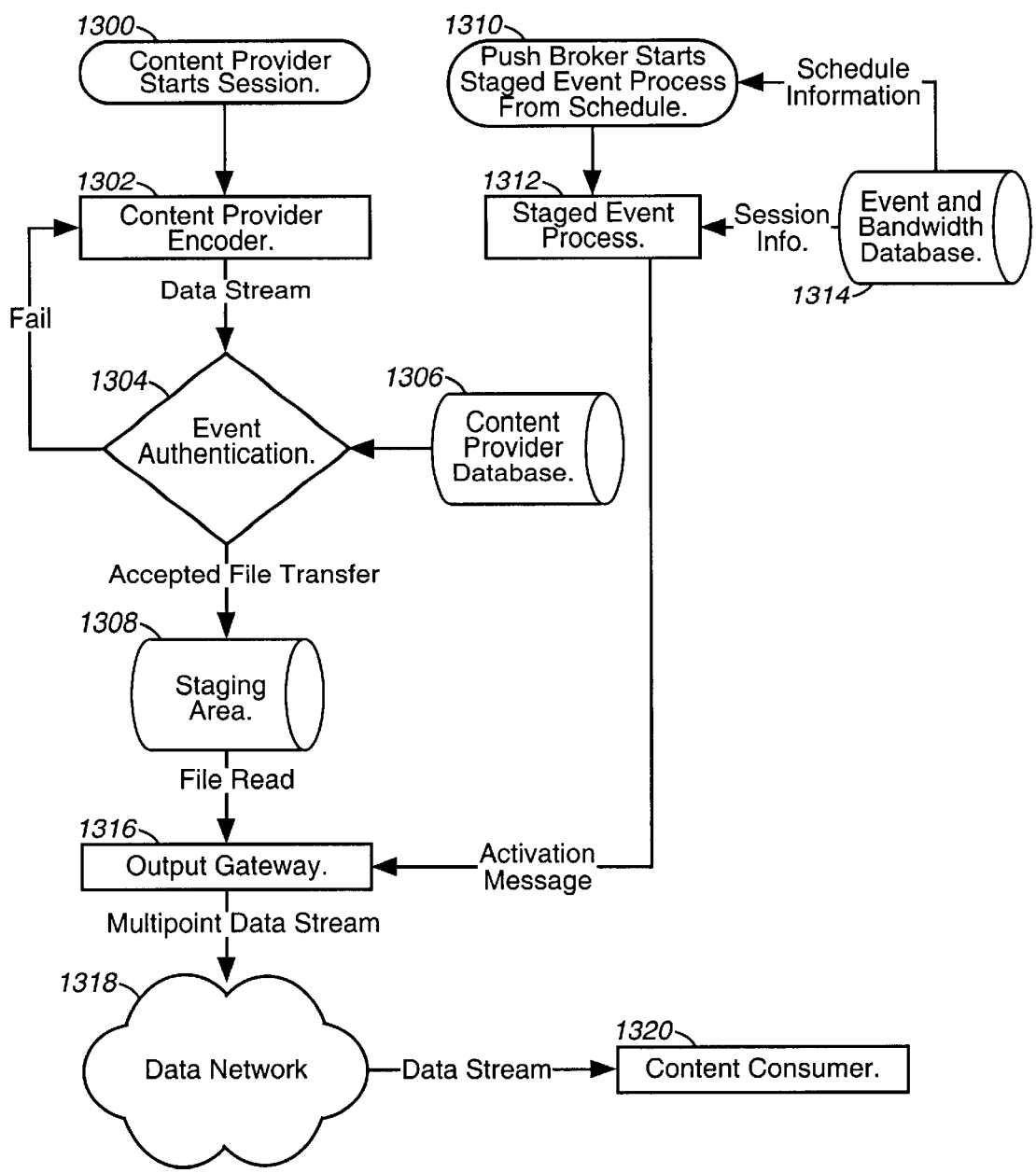
FIG. 13 is a data flow diagram showing the flow of content in a staged session from a CP to a content consumer in accordance with a preferred embodiment of the present invention.

Turning next to FIG. 13, a data flow diagram showing the flow of content in a staged session from a CP to a content consumer is depicted in accordance with a preferred embodiment of the present invention. CP 1300 causes content provider encoder 1302 to attempt to transfer a file containing the content to be delivered to content consumers. The file transfer is authenticated in block 1304 using data from CP provider database 1306 to determine whether the event for the file being transferred from the CP is authorized. If the file transfer is not authorized, failure to authenticate event to the file transfer is returned to CP encoder 1302. If the event is authenticated, the accepted file is transferred to a staging area 1308 for audio/visual files. Additionally, the push broker 1310 starts a staged event process 1312 using schedule information from event and bandwidth database 1314. Staged event process 1312 generates an activation message using the session information. This activation message is used to initiate a file read from staging area 1308 by output gateway 1316 to generate a multipoint data stream that is distributed by data network 1318 to content consumers, such as content consumer 1320.

Thus, the present invention provides an improved method and apparatus in a communications system for managing the delivery of content to content consumers. The present invention provides this advantage by implementing an interface for content providers to schedule delivery of content to the server of the present invention. This interface also allows CPs to schedule delivery of content to content consumers. Additionally, content consumers are provided an interface to subscribe to and select content for delivery. In accordance with a preferred embodiment of the present invention, this interface and its associated processes are implemented within a multicast server communication system. As a result, the multicast server communications system provides multiple CPs with an improved method and apparatus for scheduling delivery of content.

Additionally, the present invention provides an improved method and apparatus for managing delivery of content to content consumers. This advantage is provided through the use of a push broker within the server in which the push broker manages the pushing of content to selected content consumers in accordance with scheduling data. Additionally, the push broker also provides for managing the delivery of live content to content consumers.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, although the depicted example of the present invention is implemented for use in a multicast server, the present invention may be applied to other types of transmissions from content providers to content consumers, such as for example, unicasting. The embodiment was chosen and described in order to best explain the principles of the invention the practical application to enable others of ordinary skill in the art to understand the invention for various embodiments with various modifications as are suited to the particular use contemplated

What is claimed is:

1. A communications system comprising:

a network;

an interface to a content provider;

a plurality of subscribers connected to the network;

a data processing system connected to the network including:

a storage device, wherein the storage device includes a plurality of contents;

a server, wherein the server sends content to subscribers of the content;

a push broker, wherein the push broker manages delivery of contents by the server to the plurality of subscribers, wherein the push broker includes a plurality of modes of operation including:

a first mode of operation in which the push broker monitors the interface to the content provider for an establishing of a communications link to the content provider for a transmission of live content;

a second mode of operation, responsive to detecting the establishing of the communications link, in which the push broker determines whether the transmission is a valid transmission; and a third mode of operation, responsive to a valid transmission, in which the push broker directs the server to transmit the live content to the plurality of subscribers.

2. The communications system of claim 1, wherein the data processing system is a distributed data processing system in which the server on a first computer within the distributed data processing system and the push broker executes on a second computer within the distributed data processing system, wherein the first computer is in communication with the second computer.

3. The communications system of claim 1, wherein each of the plurality of subscribers receive content from the data processing system over a wireless communications link to a satellite and wherein the network includes a satellite in which the satellite delivers the content to the plurality of subscribers using multicast transmissions.

4. The communications system of claim 1, wherein the data processing system includes a fourth mode of operation in which the push broker monitors for communications from the plurality of subscribers for errors in transmission of content to the plurality of subscribers and stores errors in transmission.

5. The communications system of claim 1, wherein the first, second, and third mode of operations are executed by an event process started by the push broker.

6. A method in a communications system for managing delivery of content to a plurality of content consumers, the method comprising:

obtaining transmission information;

determining content type based on the transmission information;

receiving the content;

in response to receiving live content, determining whether the transmission is a valid transmission and transmitting, when the transmission is a valid transmission, the live content from a content provider to content consumers as the content is received;

in response to receiving staged content, storing the content in a storage device in response to a determination that the content is staged content; and transmitting the staged content to content consumers based on a transmission time assigned for the staged content.

7. A method of claim 6, wherein a plurality of content consumers have requested the content and wherein the step of transmitting the staged content comprises initiating a thread, for each content consumer requesting the content, to handle transmitting the content.

8. The method of claim 7 further comprising:
terminating a thread initiated during the initiation step in response to a completion of transmission of content to a content consumer associated with the thread.

9. A multicast data processing system for use in managing multicast delivery of content in a communications system comprising:
a database containing a schedule of events;
a server process, wherein the server process multicasts content to a plurality of content consumers; and
a live event process, having a plurality of modes of operation including:
a first mode of operation in which the live event process waits for a content provider to initiate a transmission of live content by the content provider;
a second mode of operation, responsive to initiation of the transmission of live content by the content provider, in which the live event process determines whether the transmission is a valid transmission; and
a third mode of operation, responsive to a presence of a valid transmission, in which the live event process directs transmission of content by the server process to the plurality of content consumers.

10. The multicast data processing system of claim 9, wherein in the third mode of operation, the live event process spawns an event process to direct transmission of the content by the server to the plurality targets.

11. The multicast data processing system of claim 9 further comprising:
a staged event process having a plurality of modes of operation including:
a first mode of operation in which the staged event process obtains a staged event from the database, and
a second mode of operation, responsive to obtaining a staged event, in which the staged event process updates scheduling information, wherein the staged event process returns to the first mode of operation.

12. The multicast data processing system of claim 11 further comprising:
a staged event spawner process having a plurality of modes of operation including:
a first mode of operation in which the staged event spawner process waits for a next scheduled event; and
a second mode of operation, responsive to an occurrence of the next scheduled event, in which the staged event spawner directs transmission of content associated with the next scheduled event.

13. The multicast data processing system of claim 12, wherein the live event process, the staged event process, and the staged event spawner process are threads executing within a push broker process.

14. The data processing system of claim 12, wherein the staged event spawner in the second mode of operation spawns an event process to handle transmission of the content associated with the next scheduled event.

15. The multicast data processing system of claim 14, wherein the live event process in the third mode of operation spawns an event process to direct transmission of content to the plurality of content consumers by the server process.

16. The multicast data processing system of claim 14, wherein transmission of content by the multicast server to the plurality of content consumers is a multicast transmission including a satellite based communications path.

17. A computer program product for a push broker process for use in a computer to manage delivery of content to a plurality of content consumers in a communications system, the computer program product comprising:
a computer usable medium;
first instructions for monitoring an interface to a content provider for an establishing of a communications link to the content provider for a transmission of live content;
second instructions, responsive to detecting the establishing of the communications link, in which a determination is made as to whether the transmission is a valid transmission; and
third instructions, responsive to a valid transmission, in which the live content is transmitted to the plurality of content consumers,
wherein the instructions are embodied within the computer usable medium.

18. The computer program product of claim 17 further comprising:
fourth instructions for obtaining a staged event from a schedule of staged events; and
fifth instructions, responsive to obtaining a staged event, in which scheduling information is updated.

19. The computer program product of claim 17 further comprising:
fifth instruction for detecting a next scheduled event; and
sixth instructions, responsive to an occurrence of the next scheduled event, in which transmission of content associated with the next scheduled event is directed to the plurality of content consumers.

* * * * *